(12) United States Patent
Apfel et al.

(10) Patent No.: US 7,225,713 B2
(45) Date of Patent: Jun. 5, 2007

(54) CUTTING BLADE FOR A MOTOR-DRIVEN, MANUALLY-GUIDED IMPLEMENT

(75) Inventors: Norbert Apfel, Waiblingen (DE); Roland Schierling, Affalterbach (DE); Helmut Köstner, Schwaikheim (DE); Norbert Rehbein, Schorndorf (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 10/026,099

(22) Filed: Dec. 21, 2001

(65) Prior Publication Data

US 2002/0078573 A1    Jun. 27, 2002

(30) Foreign Application Priority Data

Dec. 22, 2000    (DE) ............................ 200 21 767 U

(51) Int. Cl.
*B26D 5/08*    (2006.01)

(52) U.S. Cl. ............................ 83/666; 30/276; 30/347; 56/17.5; 56/295

(58) Field of Classification Search ................ 30/276, 30/347; 56/17.5, 295; 241/292.1, 277, 282.1, 241/291; 83/607, 663, 665, 666, 675; D15/139; D8/70

See application file for complete search history.

(56) References Cited

U.S. PATENT DOCUMENTS

| | | | |
|---|---|---|---|
| 2,651,159 A * | 9/1953 | Rountree, Sr. ............... | 56/13.8 |
| 2,788,038 A * | 4/1957 | Corcoran ................ | 241/292.1 |
| 2,799,985 A * | 7/1957 | Rosenberg ................... | 56/295 |
| 3,302,377 A * | 2/1967 | Ely .............................. | 56/295 |
| 3,343,351 A * | 9/1967 | Freedlander et al. .......... | 56/295 |
| 3,910,017 A * | 10/1975 | Thorud et al. ................ | 56/295 |
| 3,916,607 A * | 11/1975 | Howard ..................... | 56/17.5 |
| 4,261,162 A * | 4/1981 | Juncker ....................... | 56/295 |
| 4,302,878 A | 12/1981 | Bonforte | |
| 4,426,831 A * | 1/1984 | Klas et al. .................... | 56/295 |
| 4,594,843 A * | 6/1986 | Andersson et al. ........... | 56/295 |
| 4,706,446 A * | 11/1987 | Doi et al. ..................... | 56/295 |
| 4,771,593 A * | 9/1988 | Lee .............................. | 56/295 |
| 5,299,414 A | 4/1994 | Long | |
| 5,452,569 A * | 9/1995 | Anderson .................... | 56/295 |
| 5,979,285 A * | 11/1999 | Rasmussen et al. .......... | 83/676 |
| 6,446,346 B1 * | 9/2002 | Castleman ................... | 30/276 |

FOREIGN PATENT DOCUMENTS

| | | |
|---|---|---|
| AU | 20520/88 | 2/1989 |
| DE | 1701294 | 6/1955 |
| DE | 3807105 C1 * | 7/1989 |
| EP | 115545 A1 * | 8/1984 |

* cited by examiner

*Primary Examiner*—Kenneth E. Peterson
*Assistant Examiner*—Isaac Hamilton
(74) *Attorney, Agent, or Firm*—Robert W Becker & Associates; Robert W Becker

(57) ABSTRACT

A cutting blade for a motor-driven implement is provided. The cutting blade has a main body having a central fastening opening and blade sections that extend approximately radially from the main body. The blade sections have edges that extend in a radial direction and form cutting edges. Each blade section is provided with at least one bead-like embossment having a longitudinal axis that extends at an angle of between 0 and 45° relative to a longitudinal direction of the blade section.

10 Claims, 3 Drawing Sheets

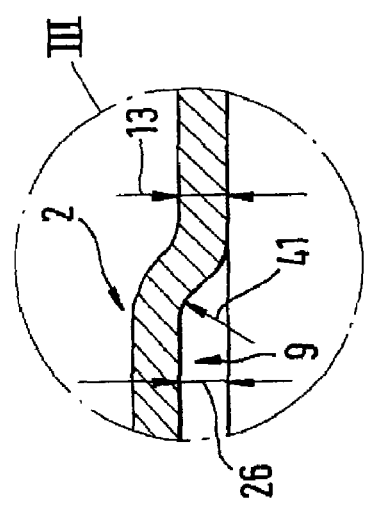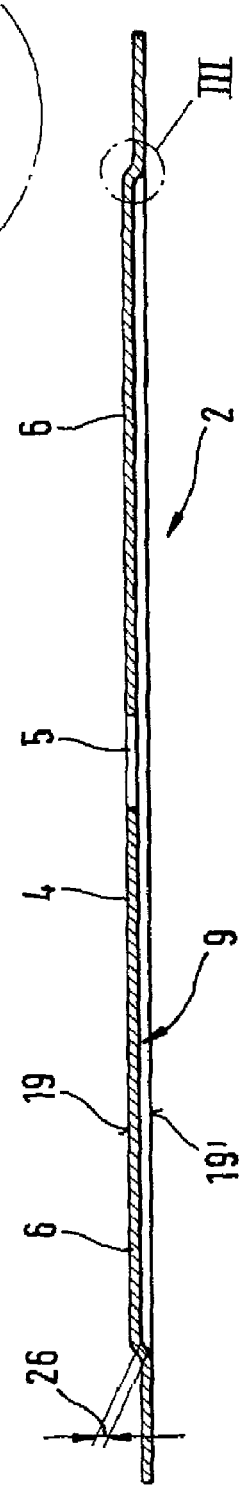

CUTTING BLADE FOR A MOTOR-DRIVEN, MANUALLY-GUIDED IMPLEMENT

BACKGROUND OF THE INVENTION

The present invention relates to a cutting blade for an implement, especially a grass-cutting blade for a brushcutter or trimmer.

A cutting blade for an implement, especially a grass-cutting blade for a motor-driven brushcutter or trimmer, is known from U.S. Pat. No. 4,302,878. This known blade is essentially made of one piece from a main body having a fastening opening and blade sections that extend from the main body. The radially extending edges of the blade sections are embodied as cutting edges. The cutting blade is a reversible blade that is economically produced from plastic.

A cutting blade of the aforementioned type wears out relatively rapidly during continuous use, and in particular is not very suitable as a grass-cutting blade for professional use.

It is therefore an object of the present invention to provide a cutting blade for a motor-driven implement that is resistant to wear and is easy to guide.

BRIEF DESCRIPTION OF THE DRAWINGS

This object, and other objects and advantages of the present invention, will appear more clearly from the following specification in conjunction with the accompanying schematic drawings, in which:

FIG. 3 is a longitudinal cross-sectional view through the cutting blade of FIG. 2;

FIG. 3a is a detailed view of the portion III in FIG. 3;

SUMMARY OF THE INVENTION

Figure 1:
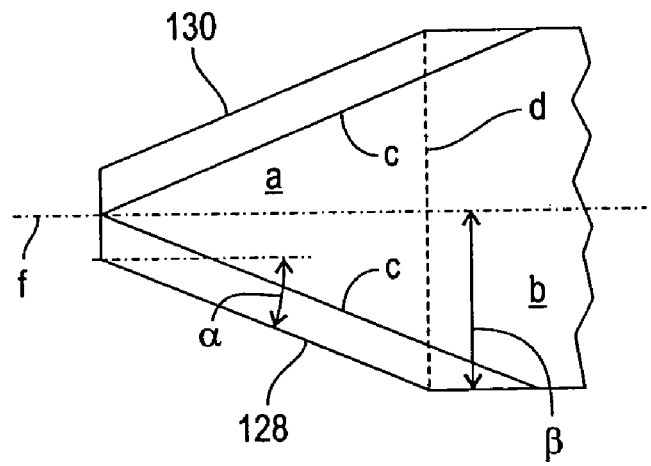
FIG. 1 is a schematic view of one exemplary embodiment of an inventive cutting blade on a brushcutter or trimmer.

The cutting blade of the present invention comprises a main body having a central fastening opening and blade sections that extend approximately radially from the main body, wherein the blade sections have edges that extend in a radial direction and form cutting edges, wherein each blade section is provided with at least one bead-like embossment having a longitudinal axis that extends at an angle of between 0 and 45° relative to a longitudinal direction of the blade section.

Advantages of the inventive cutting blade are that it is resistant to wear, is reliable against failure, and is easy to guide. A further advantage is that the implement is easy to guide without significant influence from procession forces (centrifugal forces). The cutting blade is preferably made of metal and is provided with bead-like embossments that extend along the blade sections. The direction of the beads can vary, i.e. the longitudinal axis of a respective bead-like embossment can extend not only parallel or in alignment with the respective longitudinal axis of a blade section, but also can have an angle of up to about 45° between the longitudinal axis of the respective bead-like embossment and the longitudinal axis of the blade section. In this way, the cutting blade can be formed with relatively little thickness yet can be resistant to bending and torque.

To increase the reliability against failure upon collision with a solid object such as a stone, a metal part, or the like, it is provided to form the radial ends of the blade sections of the cutting blade in the shape of part of a circle, having an appropriate radius. It is expedient to form the radius of the radial ends of the blade sections smaller or approximately equal to the radius of rotation of the cutting blade. As a result of these structural measures, it is possible, with a cutting blade that is rotating at high speed, for an obstacle to strike not the cutting edge of the blade, but rather the leading, truncated or blunt edge of the radial ends of the cutting blade. As a result, merely a slight impulse is effected that is directed radially inwardly from the obstacle to the axis of rotation of the cutting blade. A frontal striking of the obstacle upon a cutting edge of the cutting blade is thereby prevented.

To effect a draw cut of the material that is to be cut, it is expedient to have the edges of the blade sections extend to the radial ends of the blade sections in a trapezoidal manner. The blade sections of the cutting blade are thus tapered outwardly to their radial ends. It can also be expedient, rather than providing the blade sections with a trapezoidal contour, to form them in the shape of a double trapezoid. The edges of each blade section therefore extend in a bent manner relative to the longitudinal axis of the blade sections. The radially extending inner edges in other words the edges proceeding from the main body of the cutting blade, merge in an angular manner, or preferably in a radius, with the radially outer edges. The radially outer edges in turn merge in an angular manner or preferably in a radius with the radially outward, convexly extending ends of the blade section. It is expedient to form the radially outer edges shorter than the radially inner edges. In this manner a nearly elliptical contour of the cutting blade is obtained. This effects an approximately uniform distribution of bending and twisting stresses during operation of the cutting blade.

The angle between the longitudinal axis of a blade section and a radially outer edge is preferably approximately twice as great as the angle between the longitudinal axis and the radially inner edge.

The bead-like embossments, which serve for reinforcing the cutting blade, can have an approximately uniform depth over the length of the cutting blade, whereby the depth is approximately one-fourth to four times the material thickness of the cutting blade. Particularly favorable is a depth of the embossments that is between one-half and twice the material thickness. An alternative reinforcement of the cutting blade is obtained if the depth of the bead-like embossments is such that it increases from the radial ends of the blade sections to the main body. However, as a function of the selected contour of the cutting blade and further structural parameters, it can be expedient for the depth of the bead-like embossments to increase from the main body to the radial ends of the blade sections.

The width of the bead-like embossments ranges from approximately 1 to 20 times the material thickness of the cutting blade. If the contour of the cutting blade is elliptical or trapezoidal, it is expedient for the bead-like embossments to also have a contour that tapers in a trapezoidal manner outwardly from the main body.

It can be expedient for the cutting blade to have a wave like cross-sectional configuration, whereby a plurality of bead-like embossments are formed on each blade section. Depending on the selected contour of the cutting blade and of the bead-like embossments, up to six bead-like embossments can be disposed on each blade section.

The bead-like embossments can be provided not only on one side but also on both sides of the blade sections. To avoid a difference in rigidity in the cutting blade at the transition from the blade sections to the main body, it is expedient to extend the bead-like embossment on the blade sections about the fastening opening in the main body. For this purpose, a ring-shaped, but preferably a circular disk-shaped, embossment is provided about the fastening opening of the cutting blade. The circular disk-shaped embossment has a considerably larger diameter, preferably approximately 3 times as great, than the diameter of the fastening opening. The bead-like embossments preferably merge into the circular disk-shaped embossment via a radius at their boundary edges. This avoids a difference in rigidity in the region of the main body of the cutting blade. The circular disk-shaped embossment can serve for centering the cutting blade on a mounting flange of the motor-driven implement. The embossment then forms a recess into which the complementary shaped mounting flange can engage.

To increase the service life of the cutting blade, the latter is preferably embodied as a reversible blade, whereby at least all of the radial outer edges of the cutting blade are embodied as cutting edges. The radially inner edges can, in this connection, be blunt. It can be expedient to continue the cutting edges of the radially outer edges into the radially inner edges of the blade sections, with the cutting edges merging gradually or without a transition into blunt edges on the blade sections.

Since the cross-sectional surfaces and shapes of the cutting blade are minimized and optimized in accordance with lightweight construction principles, it is expedient to form the cutting blade from high strength steel on a chromium-nickel-molybdenum base.

Further specific features of the present invention will be described in detail subsequently.

DESCRIPTION OF PREFERRED EMBODIMENTS

Referring now to the drawings in detail, in FIG. 1 the cutting blade 1 is shown as a grass-cutting blade 2 of a motor-driven, manually guided implement for mowing grass and the like, namely a brushcutter or trimmer 3. The inventive cutting blade 1 can, however, also be used on other implements. The trimmer 3 comprises a guide tube 30 on which is secured a steering bar 31 for holding and guiding the trimmer 3. Disposed in a handle 32 on the steering bar 31 are operating elements, such as a gas throttle 33 for adjusting the speed of a drive motor 34 of the trimmer 3. The drive motor 34 is disposed on one end 35 of the guide tube 30. The drive motor 34 is preferably an internal combustion engine, such as a two-stroke or four-stroke engine having reciprocating or rotary pistons. Secured at the other end 36 of the guide tube 30 is a miter gear 37, about the drive shaft axis 38 of which rotates the grass-cutting blade 2. A protective shield 39 partially spans the grass-cutting blade 2 and is secured to the guide tube 30 in the vicinity of the miter gear 37.

Figure 2:
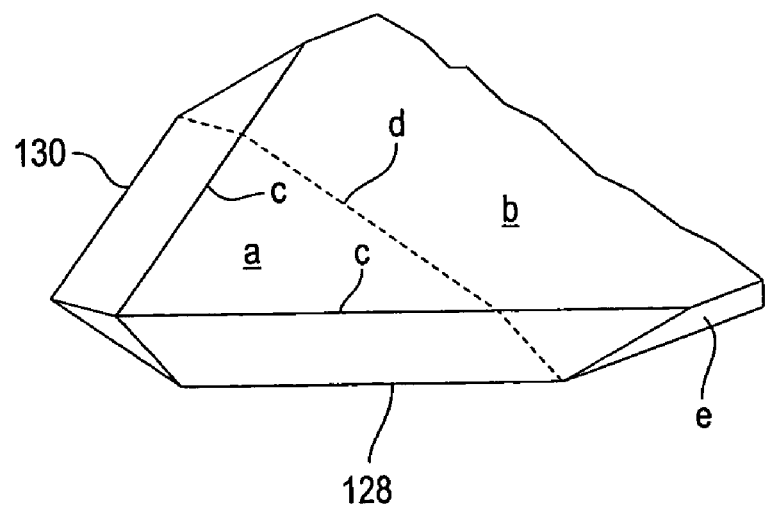
FIG. 2 is a plan view of the cutting blade of FIG. 1.

The grass-cutting blade 2 illustrated in FIG. 2 comprises a main body 4 having a central fastening opening 5 for the drive shaft of the miter gear 37. Two oppositely disposed blade sections 6 extend radially from the main body 4. As shown in FIG. 3, the blade sections 6 are disposed in a plane with the main body 4. It is to be understood that instead of just two blade sections 6 it could also be expedient to provide three, four or six blade sections on the main body 4.

The edges 7 of the blade sections 6, which edges extend approximately in a radial direction, are inclined relative to the longitudinal axis 16 of the blade sections 6 at a first angle 25 and at a second angle 24. In the illustrated embodiment, the blade sections 6 taper toward their radial ends 10 in a double trapezoidal manner. For this purpose, the radially inner edges 20, i.e. the edges of the blade sections that extend from the main body 4, are disposed at the angle 25 relative to the longitudinal axis 16. The radially inner edges 20 merge in an angular manner, or preferably with a radius 21, with radially outer edges 22. In this connection, the angle 24 between the longitudinal axis 16 and the radially outer edges is greater, preferably twice as great, than the angle 25, so that the radially outer edges 22 are angled off radially to the inner edges 20. The outer edges 22 merge in an angular manner, or preferably with a radius 23, with the radial ends 10 of the blade sections 6. Thus, the contour of the grass-cutting blade 2 has an ellipsoid shape.

The radial ends 10 of the blade sections 6 are formed by truncated edges that are curved radially outwardly. The radius 47 of the radial ends 10 is less than or approximately equal to the radius 11 of the path of the grass-cutting blade 2. As a result, the grass-cutting blade 2, by means of the in any case truncated edges of the radial ends 10 of the blade sections 6, comes into contact with an obstacle that approaches the path of the blade approximately tangentially. The cutting edges 8 formed on the edges 20 and 22 are thereby protected.

In order to keep procession forces low as the grass-cutting blade rotates, the blade 2 is formed with as little mass as possible accompanied by a high strength. For this purpose, the grass-cutting blade 2 is provided with multiple configured, bead-like embossments 9. The bead-like embossments 9 extend, approximately in the longitudinal direction of the blade sections 6, over a length 17 that is about three-fourths of the length 18 of the blade sections 6. However, the bead-like embossments 9 could also extend over the entire length or only over about one-fourth of the length 18 of the blade sections 6.

In the illustrated embodiment, the bead-like embossments 9 extend from the main body 4 to the radial ends 10 of the blade sections 6 accompanied by a decreasing width 12. The bead-like embossments 9 are formed out of one side 19 of the blade sections 6 in a manner symmetrical to the longitudinal axis 16 of the blade sections 6. It can be expedient for the width 12 of the bead-like embossments 9 to be equal over their entire length, whereby, as shown in FIG. 3a, the width of the bead-like embossments 9 is approximately 1 to 20 times the material thickness 13 of the grass-cutting blade 2. The transition of the bead-like embossments 9 into the blade sections 6 is formed with a radius 41 that is uniform over the entire peripheral edge 42 of the bead-like embossments 9.

Figure 4:
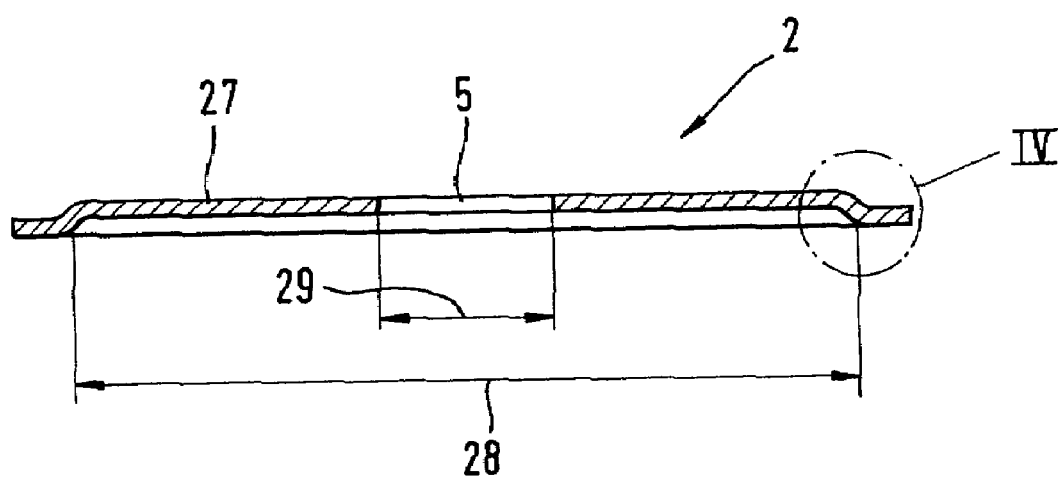
FIG. 4 is a cross-sectional view taken along the line IV-IV in FIG. 2.
Figure 4A:
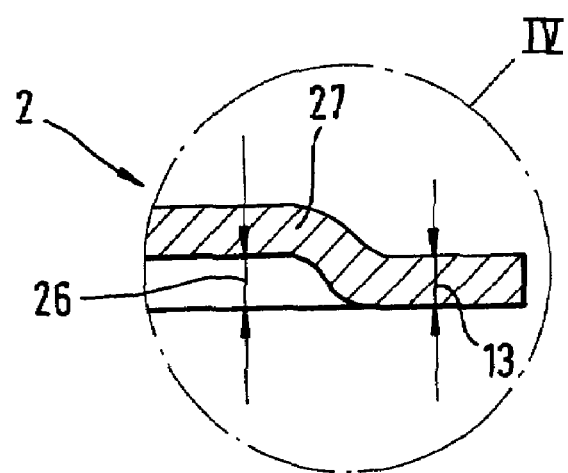
FIG. 4a is a detailed view of the portion IV in FIG. 4.

As FIGS. 3, 3a show in a longitudinal section, and FIG. 4a in a cross-section, through the grass-cutting blade 2 of FIG. 2, the depth 26 of the bead-like embossments 9 is approximately equal over the length of the blade sections 6 and corresponds approximately to one-fourth to four times the material thickness 13 of the grass-cutting blade 2, as is also the case with the depth of the circular disk-shaped embossment 27. It can also be expedient for the depth 26 of the bead-like embossments 9 to increase or decrease from the radial ends 10 of the blade sections 6 to the main body 4.

Instead of providing a respectively single bead-like embossment in each of the blade sections 6 for reinforcing the same, it can be expedient to embody the cross-section of the blade sections 6 in a wave-like manner by providing a plurality, preferably up to six, of the bead-like embossments 9 in the blade sections 6. These embossments can be alternatingly disposed on both sides 19, 19' of the grass-cutting blade 2, and their depth can vary or can be the same. Instead of extending parallel to the longitudinal axis 16 of the blade section 6, the longitudinal axis of the bead-like embossments 9 could also extend at an angle, preferably up to 45°, to the longitudinal axis 16 of the blade sections 6.

To avoid a difference in rigidity during the transition from the blade sections 6 to the main body 4, a circular disk-shaped embossment 27 is provided about the fastening opening 5. In the cross-sectional view of FIG. 4 taken along the line IV-IV in FIG. 2, the planar, circular disk-shaped embossment 27 that is disposed about the fastening opening 5 is clearly shown. The diameter 28 of the circular disk-shaped embossment 27 is approximately three times as great as the diameter 29 of the fastening opening 5. The circular disk-shaped embossment 27 is disposed on the same side as the bead-like embossments 9 in the blade sections 6 of the grass-cutting blade 2. The bead-like embossments 9 of the blade sections 6 merge into the circular disk-shaped embossment 27 without a jump in the topographical height of the grass-cutting blade 2. As a result, a difference in rigidity in the grass-cutting blade 2 is effectively prevented.

In FIG. 2 the grass-cutting blade 2 is illustrated as a reversible blade, whereby the radially outer edges are entirely, and the radially inner edges 20 are over a partial length, embodied as cutting edges 8 on one side. The cutting edges 8 on the radially outer edges 22 are formed by inclined or beveled surfaces 43 that extend from one side 19 of the blade section 6 to the other side 19' thereof. The beveled surfaces 43 have the same incline over their entire extent. The respectively radially inner edges 20 of a blade section 6 are formed as cutting edges over a length 44 that corresponds approximately to half of the edge length of the respective radially inner edge 20. These cutting edges extend progressively into a blunt edge from their connection 45 at the edge or the radius 21 to the connection 46 that is disposed opposite the connection 45. It can be expedient to provide the cutting edges 8 on both sides, i.e. with beveled surfaces 43 that extend on both sides 19, 19' of the grass-cutting blade 2.

The grass-cutting blade 2 has a particularly long life and high reliability against failure if it is made out of steel on a Chromium-Nickel-Molybdenum base.

The present invention is, of course, in no way restricted to the specific disclosure of the specification and drawings, but also encompasses any modifications within the scope of the appended claims.

We claim:

1. A cutting blade for a motor-driven implement, said cutting blade comprising:
   a main body of metal having a central fastening opening and blade sections, also of metal, that extend approximately radially from said main body, wherein said blade sections are disposed in a plane with the main body, and wherein said blade sections have edges that extend in a radial direction and form cutting edges, wherein radially outer edges of said blade sections are embodied as additional cutting edges, wherein said radially inner edges merge with said radially outer edges and said edges extend in a double trapezoidal tapering shape to radial ends of said blade sections, wherein an angle is provided between a longitudinal axis of a given one of said blade sections and one of said radially outer cutting edges, wherein said angle is larger than an angle between said longitudinal axis and one of said radially inner cutting edges, to obtain a nearly elliptical contour of the cutting blade.

2. A cutting blade according to claim 1, wherein said radially inner cutting edges merge in an angular manner with said radially outer cutting edges, and wherein said radially outer cutting edges merge in an angular manner with said radial ends of said blade section.

3. A cutting blade according to claim 1, wherein said radially inner cutting edges merge with a radius with said radially outer cutting edges, and wherein said radially outer cutting edges merge with a radius with said radial ends of said blade section.

4. A cutting blade according to claim 1, wherein said radially inner cutting edges merge in an angular manner with said radially outer cutting edges, and wherein said radially outer cutting edges merge with a radius with said radial ends of said blade section.

5. A cutting blade according to claim 1, wherein said radially inner cutting edges merge with a radius with said radially outer cutting edges, and wherein said radially outer cutting edges merge in an angular manner with said radial ends of said blade section.

6. A cutting blade for a motor-driven implement, said cutting blade comprising:
   a main body of metal having a central fastening opening and blade sections, also of metal, that extend approximately radially from said main body, wherein said blade sections have edges that extend in a radial direction and form cutting edges, wherein radially outer edges of said blade sections are embodied as additional cutting edges, wherein said radially inner edges and said radially outer edges extend in a double trapezoidal tapering shape to radial ends of said blade sections, wherein an angle is provided between a longitudinal axis of a given one of said blade sections and one of said radially outer cutting edges,
   wherein said angle between said longitudinal axis and one of said radially outer edges is approximately twice as large as an angle between said longitudinal axis and one of said radially inner cutting edges, to obtain a nearly elliptical contour of the cutting blade.

7. A cutting blade according to claim 6, wherein said radially outer cutting edges are shorter than said radially inner cutting edges.

8. A cutting blade according to claim 6, wherein said radially inner edges and said radially outer edges extend in a double trapezoidal tapering shape to form a substantially elliptical contour of said cutting blade.

9. A cutting blade according to claim 6, wherein said cutting blade is a reversible blade.

10. A cutting blade according to claim 6, wherein said blade sections are disposed in a plane with said main body.

* * * * *